Aug. 7, 1945.　　　　F. M. RODDY　　　　2,381,775
GRANULATING AND CUTTING MACHINE
Filed Jan. 7, 1942　　　　4 Sheets-Sheet 1

FRED M. RODDY
INVENTOR

By W. Russell Greenwood
ATTORNEY

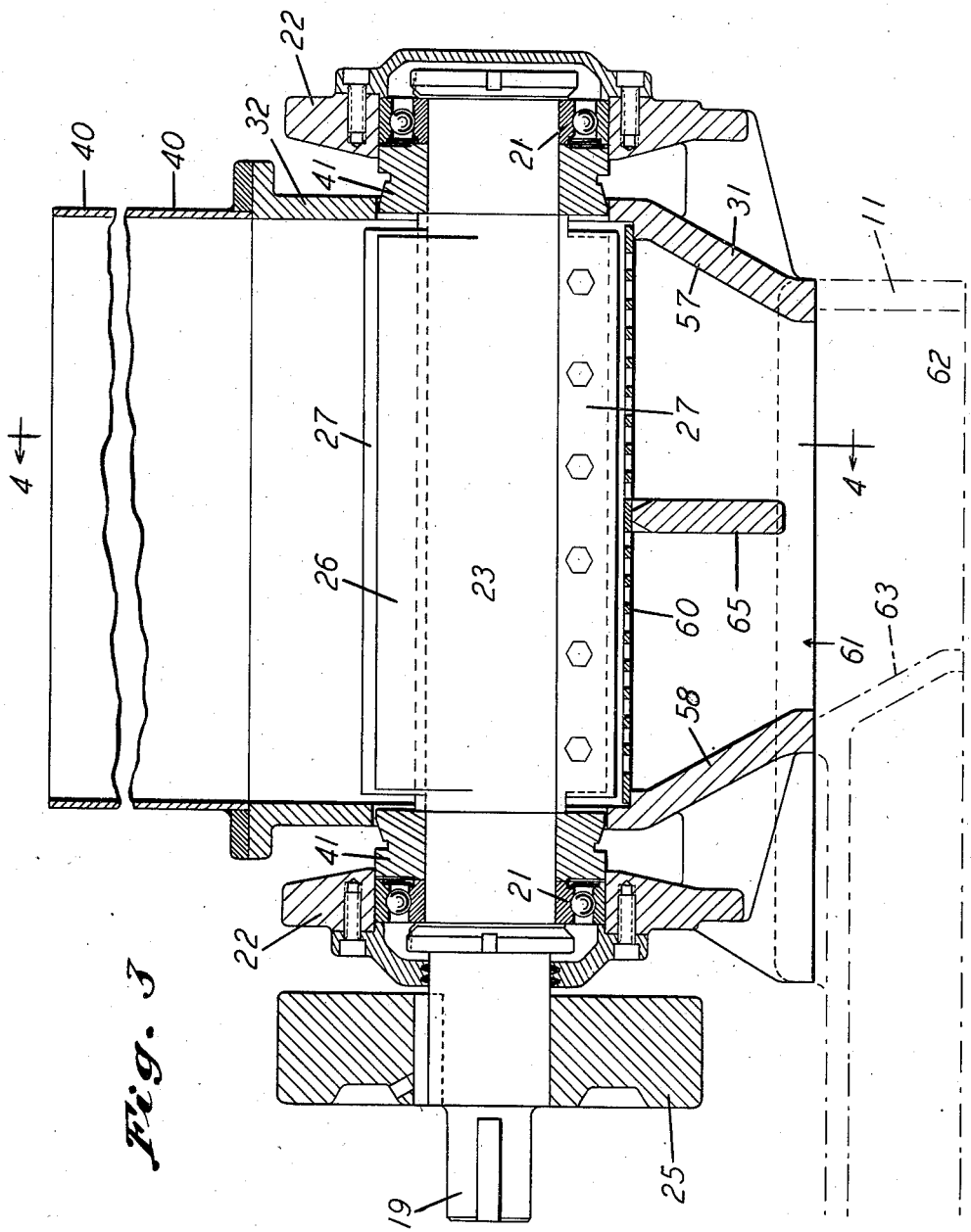

Aug. 7, 1945.    F. M. RODDY    2,381,775
GRANULATING AND CUTTING MACHINE
Filed Jan. 7, 1942    4 Sheets-Sheet 3

FRED M. RODDY
INVENTOR
By W. Russell Greenwood
ATTORNEY

Aug. 7, 1945.　　　　F. M. RODDY　　　　2,381,775
GRANULATING AND CUTTING MACHINE
Filed Jan. 7, 1942　　　　4 Sheets-Sheet 4
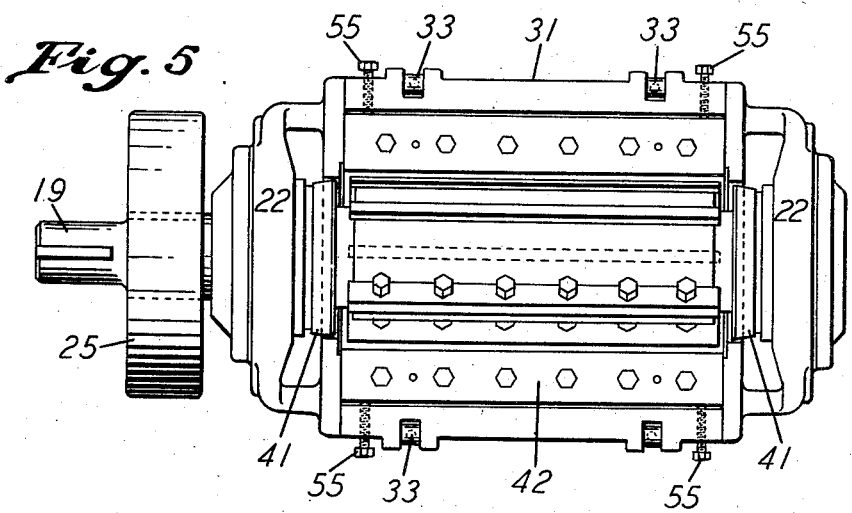
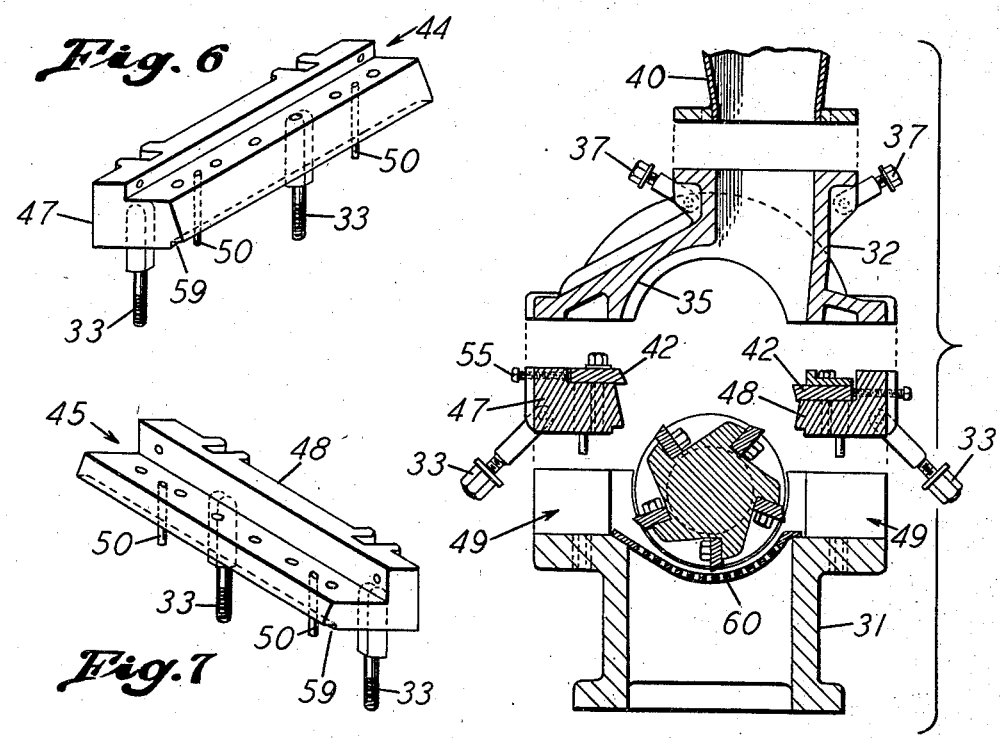
FRED M. RODDY
INVENTOR
By W. Russell Greenwood
ATTORNEY Patented Aug. 7, 1945

2,381,775

UNITED STATES PATENT OFFICE 2,381,775

GRANULATING AND CUTTING MACHINE

Fred M. Roddy, Providence, R. I.

Application January 7, 1942, Serial No. 425,923

12 Claims. (Cl. 241—73)

This invention relates to granulating and cutting machines and, in particular, to a rotary cutting machine especially adapted for processing plastics, for example, scraps of thermoplastic materials, to chop and cut such material into chopped bodies of predetermined degree of fineness.

In my co-pending application, Serial No. 425,922 filed January 7, 1942, entitled "Rotary cutting and granulating machines," which became Patent No. 2,326,682 on August 10, 1943, I have described and claimed a rotary cutting machine especially designed for cutting plastics, for example scraps of thermoplastic materials, to reduce them to predetermined degrees of fineness. It is a characteristic of the structure of the machine forming the subject matter of this co-pending application that the rotary knives and the casing within which they rotate both overhang one end of the bearing support for the rotor shaft. In this prior machine the end casing is in two parts, and the overhanging arrangement is provided for the purpose of making it easier for the workman to remove the lower half of the end casing without having to lift and support the weight of this lower end casing while dismantling the machine for cleaning.

In accordance with the present invention, the cutting machine is of larger size than the machine of my co-pending application just described, and the knife carrying rotor is supported with bearings at each end with the rotary knives carried by the intermediate portion of the rotor. This machine also has an overhung relationship with respect to the base and discharges the material forward of the base. As will later be pointed out, however, there is a distinction in the purpose of the overhanging arrangement as compared with the machine of my above-mentioned co-pending application.

In this machine there are two adjustable stationary knives carried by blocks which are removably mounted in deep recesses in the lower casing element of the two part casing surrounding the rotary knives so that upon removal of the blocks with the stationary knives affixed thereto the cutting chamber is rendered readily accessible for cleaning. These stationary knives are arranged in the lower half of the end casing at substantially diametrically opposite positions on the cutting circle of the rotary cutting means and these stationary knives are carried by blocks which are fixed in appropriate recesses in the opposite side walls of the lower casing element; and the surfaces of these knife beds are accurately machined and scraped whereby an accurate fit is obtained so that no powdered plastic material or dust from the cutting operation can enter and lodge beneath the knives. The knife carrying blocks also are dowelled to the lower casing element when in place thereon and thus are accurately located in their recesses.

A closure ring is carried by the rotor at each end of the casing between the terminal ends of the rotor knives and the bearings for the rotor. The upper and lower halves of the casings and the removable blocks carrying the stationary knives are securely bolted together and dowelled, and the machine casing bored accurately at its opposite ends so as to give a small clearance between these bored holes and the closure rings that are positioned therein so that both the dust leaking outwardly from the cutting chamber around the closure ring and any lubricant that may leak from the anti-friction bearings supporting the rotor will be thrown off into space exteriorly of the machine by centrifugal force upon impinging the outer periphery of the closure rings. A screen is removably mounted upon the lower half of the casing and may be readily lifted out after removal of the blocks carrying the stationary knives after the upper casing element or cover has been taken off.

It is accordingly one object of the present invention to provide a granulating and cutting machine capable of attaining the aforementioned desirable advantages.

Another object of the invention is to provide a machine for cutting plastics having a more rugged and rigid construction than has heretofore been employed on machines of this type and therefore less apt to be injured by rough usage.

Another object of the invention is to provide an overhung arrangement in a machine of this type of construction which will eliminate the use of supports or piers as has characterized previous constructions of machines of this class and has made the installation of such prior machines more costly and also did not permit the shipping of such machines assembled as single units.

Another object of the present invention is to provide a machine of this type in which the material after being processed will be discharged at a point well forward of the base.

Another object of the invention is to provide a machine of this class in which the adjustable stationary knives are attached to removable filler blocks having substantial thickness, such filler blocks with knives attached thereto being lifted out bodily from the lower casing member to leave deep openings in order to provide greater accessibility to the cutting chamber when cleaning the machine.

Another object of the invention is the integral construction of the lower part of the machine casing and the end housings for the rotor bearings.

With these and other objects in view as will be apparent in the following specification the invention consists in the novel construction and combination of the several parts as will be hereinafter fully set forth, and pointed out in the claims appended hereto.

In the accompanying drawings:

Fig. 3 is a central longitudinal sectional view of the rotary cutter unit of the cutting machine shown in Fig. 1;

Fig. 5 is a top plan view of the rotary cutter unit shown in Fig. 1 with the upper casing member or cover removed;

Fig. 6 is a perspective view of one of the knife carrying blocks with the stationary knife removed;

Fig. 7 is a perspective view of the other knife carrying block with its stationary knife removed;

Fig. 8 is an exploded end view of the cutter shown in Fig. 4.

Figure 2:
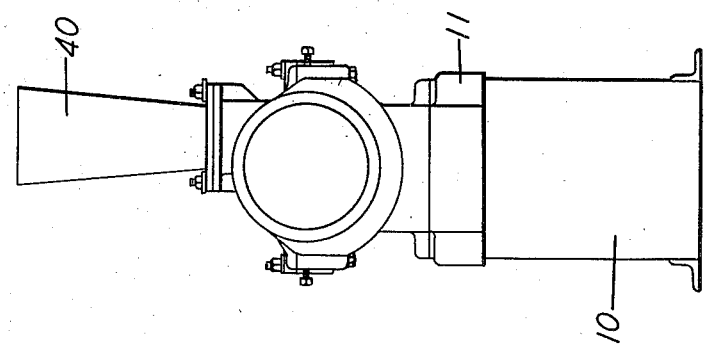
Fig. 2 is an end view of the cutting machine shown in Fig. 1 as viewed from the right.
Figure 1:
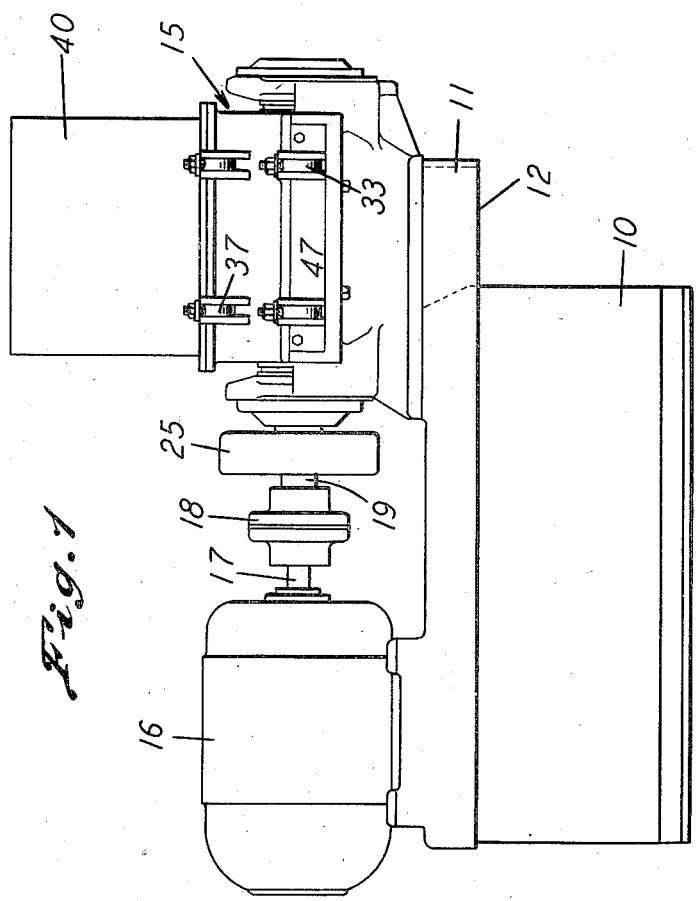
Fig. 1 is a side elevational view of a motor-driven rotary cutting machine embodying my invention.

Referring now to the drawings, particularly to Figs. 1 and 2, a base 10 carries an enlarged upper table member 11 which projects outwardly for a considerable distance beyond one end of the base and presents the overhanging outward extension 12. Mounted at one end portion of this upper table member 11 so as to be partially supported by the extension 12 thereof and to partially overhang the base 10 is the novel rotary cutter of the present invention which is generally designated by the reference numeral 15. Suitable driving means for the cutter 15, here shown as an electric motor 16 provided with a drive shaft 17, is mounted upon the other end portion of the table member 11. The drive shaft 17 is drivingly connected through flexible coupling 18 with the rotor shaft 19 of the cutter 15.

The rotary cutter 15 is provided at its opposite ends with suitable anti-friction bearings 21 (see Fig. 3) in which is journaled the rotor shaft 19. The end bearings 21 are suitably arranged in housings 22 integral with the lower casing element 31. Mounted upon and secured to the exterior portion of the rotor shaft 19 between the coupling 18 and the cutter unit 15 is a flywheel 25 which is of suitable size and weight for overcoming the shocks due to cutting, and for preventing excessive vibration of the machine during running.

Formed integrally with the main body portion 23 of the rotor 19 is the knife carrying part of the rotor comprising a plurality of radial rotor arms 26, here shown as five in number (see Fig. 4), upon which are mounted and secured thereto by suitable fastening devices the rotor knives 27. In the illustrated embodiment, each of the knives 27 is secured to the rotor head by a plurality of bolts 28 which pass through suitable holes in the knives and are threaded into the associated rotor arm 26.

A sectional casing generally designated by the reference numeral 30 is provided within which the rotor knives 27 revolve. In the form shown in the drawings, this casing 30 is composed of the two separable half casing members 31 and 32. The upper casing 32 is mounted upon the lower casing 31 and is detachably secured thereto by clamping swing bolts 33 which are pivotally mounted in external recesses between the ears 34 at opposite sides of the casing 31. The bottom of the upper casing 32 is formed with a semi-cylindrical recess 35 which is concentric with the circular path of the rotor knives 27 and forms the upper part of the cutting chamber of the machine. Upper casing 32 is provided with an inwardly extending feeding conduit 36 offset laterally to the right as viewed in Fig. 4 from a vertical plane of the axis of rotation of the rotor 19 and the lower end of the conduit 36 opens into the recess 35.

Communicating with the upper end of the feeding conduit 36 and removably fastened to the upper end of the upper casing member 32 by clamping swing bolts 37 which are pivotally mounted in suitable external recesses between the ears 38 at the opposite sides of the upper casing 32 is a feed hopper 40 of any suitable construction.

At the opposite ends of the casings 31 and 32 between each anti-friction bearings 21 and the proximate ends of the rotor knives 27, a closure ring 41 is provided on the rotor shaft and clearance in the form of an open space is provided around the periphery of each closure ring 41 so that both the dust leaking from the cutting chamber and any lubricant that may leak from the anti-friction bearings 21 will be thrown off into space by the action of centrifugal force when it reaches the outer periphery of the seal ring and thus cannot work into the cutting chamber to contaminate the plastic material being cut therein.

Figure 4:
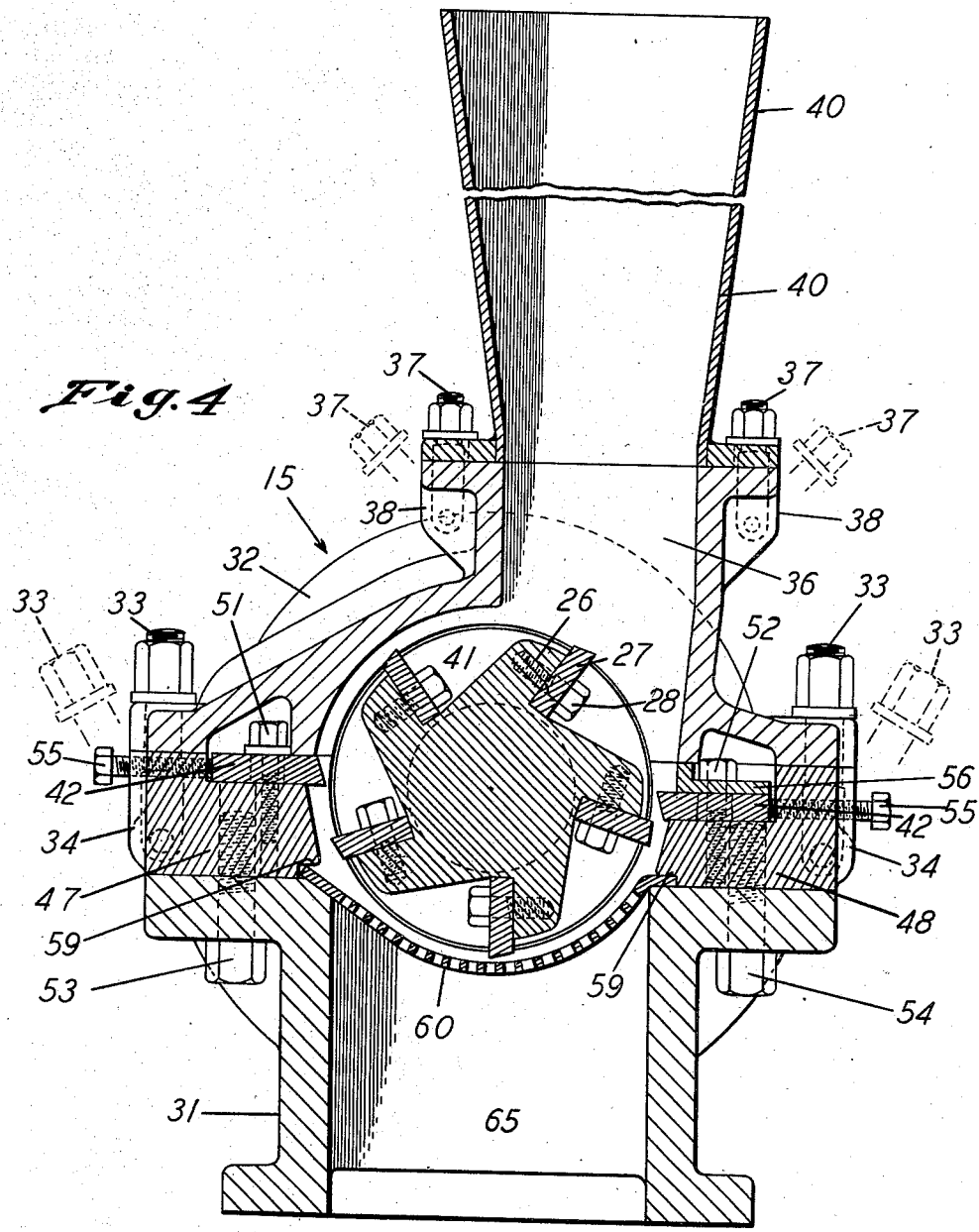
Fig. 4 is a transverse sectional view taken substantially on the line 4—4 of Fig. 3.

The lower half casing member 31 carries the two beveled stationary knives 42 of substantially the same length as the rotor knives 27. The mounting of these stationary knives constitutes one of the novel features of the machine, and in the form shown the knives 42 are positioned at opposite sides of the rotor head and have the tips of their cutting edges lying in a horizontal plane containing the axis of the rotor and also disposed on the cutting circle of the rotary knives 27. As shown in Figs. 4 and 8 the stationary knives 42 are of identical construction and they are located within longitudinal recesses 44 and 45 formed in the upper edge portions of the cutter blocks 47 and 48 respectively mounted in deep cut out openings 49 in the upper part of the lower casing member 31. Dowels 50 carried by the blocks 47 and 48 serve to accurately locate cutter blocks with their knives 42 in the cut out openings 49.

The knives 42 are of substantially the same length as the blocks 47 and 48 and extend into the cutting chamber from diametrically opposite sides of the rotor. The knives 42 are of bar-like form and they are secured in place by bolts 51 and 52 respectively which pass through suitable slots formed in the knives. Bolts 53 and 54 fixedly secure the blocks 47 and 48 respectively to the lower casing element 31. Set screws 55 are provided which prevent the knives 42 from backing away from the rotor during the cutting operation and also serve as a means for adjusting the stationary knives inward toward the rotor.

To provide for the alignment of the cutting edges of the knives 42, the recess 45 in the block 48 is made deeper than the recess 44 in the other block to form a lower knife bed for the inverted knife 42. An L-shaped bar 56 bolted in place by the bolts 52 securing the inverted knife 42 fills the space between this knife and the top of the block 48.

The surfaces under the stationary knives 42 are accurately machined and scraped so that when the knives are securely bolted in place in the recesses 44 and 45 it will be impossible for powdered plastic material to work underneath the knives to become lodged between the knives and their supporting surfaces.

Mounted upon suitable ledges of the end walls 57 and 58 of the casing 31 and securely held in position clamped at its opposite ends in the undercut edges 59 respectively of the cutter blocks 47 and 48 and yet readily removable when the blocks 47 and 48 are disassembled from the casing 31, is an arcuate bottom screen 60 of any desired mesh. The curvature of the inner face of the screen 60 is concentric with the cutting circle of the rotor knives 27 and the screen is slightly spaced therefrom and forms the bottom of the cutting chamber of the machine. In practice, a set of interchangeable screens 60 of different mesh may be employed so that the plastic material being cut will be held back in the cutting chamber until it is chopped to a desired particle size to pass through the screen.

The lower casing 31 is provided with a delivery conduit 61 which discharges the cut and screened plastic material into a chute opening 62 beneath the casing 31 and formed in the extension 12 of the table member 11. An inclined baffle 63 in the chute opening serves to deflect the discharged material forward, allowing more room to insert a drum or other container under the chute opening through which the processed material issues. A strut 65 beneath the screen 60 extending centrally and laterally across the machine supports the mid-portion of the screen.

The operation of the machine is as follows: Assume a screen 60 of the desired mesh to be in place in the lower casing 31. The plastic material to be cut is then introduced into the hopper 40 and passes therefrom into the cutting chamber. As soon as the plastic material is chopped to the desired particle sizes to pass through the screen 60 it is discharged through the chute opening 62 into a drum, barrel or other container. After a batch of the plastic material has been processed the interior of the cutting chamber may be made readily accessible for cleaning, removal and sharpening of the knives or insertion of a different screen 60, by unloosening and swinging aside the swing bolts 33. The upper end casing 32 and hopper 40 may be removed together as a unit or the hopper 40 may be dismantled first by releasing the swing bolts 37 and swinging them to one side after which the upper end casing 32 is similarly detached by unloosening the swing bolts 33 and swinging them to one side and then lifting off the upper casing 32. The bolts 53 and 54 which attach the blocks 47 and 48 to the lower casing are then removed and the said blocks 47 and 48 with their associated knives and swing bolts lifted from the machine. The screen 60 may then be removed. The various removed parts of the machine may then be cleaned and ready accessibility is provided to the rotor and the interior of the lower casing.

When the rotor knives 27 are removed from the rotor arms 26, the rotor 19 with the closure rings 41 and end bearings 21 in place may be inserted through the bearing openings in the bearing housings which openings are large enough for the rotor and the closure rings 41 to pass therethrough.

By supporting the machine so as to overhang the base, it is found that this arrangement permits the machine to be shipped completely assembled as a unit whereas in present types of machines having a long rotor and bearings at each end, it has been the practice to provide separate supports or piers at each end of the machine and thus increased the cost of these prior machines as well as rendering it difficult to place a container under the cutter to catch the processed material.

While the invention has been described with particular reference to the cutting of plastics it will be understood that it is not limited to a machine for operating upon said types of materials, as the machine is suitable for cutting, chopping, disintegrating or shredding to a predetermined fineness a wide variety of materials such as grain, rubber, leathers, bark, roots, tobacco, paper, rags, etc.

Various modifications will be apparent from the foregoing description to those skilled in the art, and it is intended that the invention be limited only by the scope of the appended claims.

I claim:

1. A cutting machine comprising a base, a two part casing the bottom member of which is fixedly secured to said base, said casing parts when in assembled position providing a cutting chamber for the material to be cut, said bottom casing member being provided with deep openings in the upper part of its opposite side walls and extending lengthwise of said cutting chamber, a rotor within said casing, knives carried by said rotor and rotated thereby within said cutting chamber, knife-blocks in said openings in the lower member of said casing, means detachably securing said blocks in place in said openings, stationary knives affixed to said blocks and extending into said cutting chamber to coact with said rotor knives, a curved bottom screen in said casing and clampingly secured in place therein by said knife-blocks, and end bearings mounted in housings integral with the lower casing member and disposed exteriorly of said casing for rotatably supporting the opposite end portions of said rotor.

2. A cutting machine comprising a base, a casing fixedly secured to said base having a cutting chamber for the material to be cut, and provided with longitudinally extending openings on opposite sides and beneath the center of the cutting chamber, said casing extending beyond one end of said base in overhung relationship thereto, a rotor within said casing, knives carried by said rotor, knife-blocks in said openings in said casing, means detachably securing said knife blocks to said casing, stationary knives carried by said blocks and adjustably secured thereto, said stationary knives extending into said cutting chamber to coact with said rotor knives, a curved bottom screen in said casing and clampingly secured in place therein by said knife-blocks, end bearings mounted on said casing exteriorly thereof for supporting the opposite end portions of said rotor, and closure rings on said rotor at the opposite ends of said casing between the terminal ends of said rotor knives and said rotor bearings, the arrangement of said closure rings being such that there is provided between their peripheries and the portion of the casing adjacent thereto annular end openings through which dust from the material that is being disintegrated in the cutting chamber can pass and be thown exteriorly of the machine after impact with said rings.

3. A cutting machine comprising a base, a casing fixedly secured to said base having enlarged aligned end bores and a cutting chamber for the material to be cut, said casing extending beyond one end of said base in overhung relationship thereto, a rotor within said casing, the opposite end portions of said rotor extending outwardly through said end bores of said casing, knives carried by said rotor, longitudinally recessed blocks removably mounted on said casing, means detachably securing said blocks to said casing, stationary knives carried by said blocks and adjustably secured thereto, said stationary knives extending into said cutting chamber to coact with said rotor knives, end bearings mounted on said casing supporting the opposite end portions of said rotor, and closure rings on said rotor and located in said end bores of said casing, the outer periphery of each of said closure rings being spaced sufficiently from the contiguous face of the associated end bore to provide an open space around the closure ring so that dust from the cutting chamber and lubricant leaking from the end bearings will be thrown exteriorly of the machine upon impingement with said rotary closure rings.

4. A cutting machine comprising a rotor, knives carried by the rotor intermediate of its ends, a casing surrounding said rotor knives, bearings at opposite ends of said casing supporting said rotor, a base, said casing being mounted upon said base in partially overhanging relationship with respect to one end thereof, the said casing comprising a lower half casing section and a cover half section providing a cutting chamber about said rotor knives, knife blocks mounted in deep openings formed in the upper part of opposite side walls of said lower half casing section, stationary knives affixed to said blocks extending into said cutting chamber to coact with said rotor knives, a curved bottom screen in said lower half casing section and clampingly secured therein by said knife-blocks, and means detachably securing said blocks in place in said openings to said casing and permitting removal of said knife-blocks out of said openings and from said casing whereby said screen can be readily removed and said cutting chamber will be rendered readily accessible to facilitate cleaning.

5. A cutting machine comprising a rotor, knives carried by the rotor intermediate of its ends, a casing surrounding said rotor knives, bearings at opposite ends of said casing supporting said rotor, a base, said casing being mounted upon said base in partially overhanging relationship with respect to one end thereof, the said casing comprising a lower half casing section and a cover half section providing a cutting chamber about said rotor knives, knife blocks mounted in deep openings formed in the upper part of opposite side walls of said lower half casing section, stationary knives affixed to said blocks extending into said cutting chamber to coact with said rotor knives, dowels accurately locating said blocks and their associated knives with respect to said rotor, a curved bottom screen in said lower half casing section and clampingly secured therein by said knife-blocks, and means detachably securing said blocks in place in said openings to said casing and permitting removal of said knife-blocks out of said openings and from said casing whereby said screen can be readily removed and said cutting chamber will be rendered readily accessible to facilitate cleaning.

6. A cutting machine comprising a base, a two part casing the lower member of which is fixedly secured to said base, said casing parts when in assembled position providing a cutting chamber for the material to be cut, a rotor within said casing, knives carried by said rotor, stationary knives within said casing positioned to coact with said rotor knives, bearings supporting the opposite end portions of said rotor, and bearing housings within which said bearings are accommodated, said bearing housings being spaced from the ends of said casing and integral with said lower casing and having bores of such diameter as to permit the rotor, when the knives are dismantled therefrom, to be inserted and removed through the bores of the bearing housings.

7. A rotary cutting or granulating machine comprising a casing having a cutting chamber with enlarged aligned end bores, a rotor in said chamber, end bearings for said rotor mounted on the casing outside the said end bores, knives carried by said rotor, stationary knives arranged in cooperative relation to said rotor knives, and closure rings mounted on said rotor for rotation therewith and arranged in said end bores, the outer periphery of each of said closure rings being spaced sufficiently from the contiguous face of the associated end bore to provide an open space around the closure ring through which dust from the material that is being disintegrated in the cutting chamber and any lubricant that may leak from the end bearings can pass and be thrown exteriorly of the machine upon impingement with said rotary closure rings.

8. In a rotary cutting or granulating machine of the class described, the combination of a rotary cutter, a casing thereabout, said casing being provided with openings therethrough extending lengthwise of said rotary cutter, knife-blocks in said openings, knives carried by said knife-blocks in cooperative relation to the knives of said rotary cutter, a curved bottom screen in said casing and forming with the upper part of said casing a cutting chamber about and spaced from said rotary cutter, said screen being secured in place by said knife-blocks and yet being readily removable after removal of the knife-blocks from said casing, and means for releasably securing said knife-blocks in said openings to said casing and permitting removal of said knife-blocks with their knives out of said openings and from said casing without affecting the adjusted relations between said knives and said knife-blocks.

9. In a rotary cutting or granulating machine of the class described, the combination of a rotary cutter, a casing thereabout, said casing being provided with openings therethrough extending lengthwise of said rotary cutter, knife-blocks in said openings, knives carried by said knife-blocks in cooperative relation with said rotary cutter, the inner bottom edge portions of said knife-blocks being longitudinally recessed along their entire length, a curved bottom screen in said casing and forming with the upper part of the casing a cutting chamber about and spaced from said rotary cutter, said screen having its ends disposed in said recesses in said knife-blocks and being clampingly secured to said casing by said knife-blocks, said screen being readily removable after removal of the knife-blocks from the casing, and means for releasably securing said knife-blocks in said openings to said casing and permitting removal of said blocks therefrom without disturbing the adjusted relations between said knives and said knife-blocks.

10. In a rotary cutting or granulating machine of the class described, the combination of a rotary cutter, a casing thereabout, said casing being composed of separable upper and lower casing sections, said lower casing section being provided with deep cut out openings at opposite sides and terminating at the parting-line of the casing, said openings extending lengthwise of said rotary cutter, knife-blocks in said openings, knives carried by said knife-blocks in cooperative relation to said rotary cutter, the inner bottom edge portions of said knife-blocks being longitudinally recessed along their entire length, ledge members on the end walls of said lower casing, an arcuate bottom screen in said casing, said screen resting on and supported at its arcuate side edge portions by said ledge members and forming with the upper casing section a cutting chamber about and spaced from said rotary cutter, said screen having its ends disposed in said recesses in said knife-blocks and being clampingly secured to said casing by said knife-blocks, said screen being readily removable after removal of the knife-blocks from the casing, and means for releasably securing said knife-blocks in said openings to said casing and permitting removal of said knife-blocks with their knives out of said openings and from the casing without affecting the adjusted relations between said knives and said knife-blocks.

11. A cutting or granulating machine comprising a base, a table on said base overhanging one end thereof, a casing mounted on the table along the said overhanging portion thereof, a rotary cutter in said casing having its axis extending parallel with said table from beyond the outer end of the said overhanging portion to overlie a part of the base, end bearings at the opposite end portions of said rotary cutter rotatably supporting the rotary cutter in said casing, stationary knives within said casing in cooperative relation with said rotary cutter, and chute means in said overhanging portion of said table communicating with said casing and constructed and arranged for discharging and deflecting the processed material outside the end of the said base where the table overhangs.

12. A cutting or granulating machine comprising a base, a table on said base having a portion overhanging one end of said base, a casing mounted on said table along the overhanging portion thereof, a rotary cutter in said casing having its axis extending parallel with said table from the beyond the outer end of said overhanging portion to overlie a part of the base, end bearings rotatably supporting said rotary cutter and located at the opposite end portions thereof, and stationary knives within said casing in cooperative relation with said rotary cutter, the lower part of the casing below the rotary cutter being shaped to provide a converging passage with outlet for the processed material, and the overhanging portion of the table having a passage with its inlet opening in register with the outlet of said casing and with its discharge outlet outside the end of the base where the table overhangs, the wall of the table passage adjacent the said end of the base being inclined for deflecting the processed material beyond the said end of the base.

FRED M. RODDY.